United States Patent [19]

Coppel

[11] 4,018,347

[45] Apr. 19, 1977

[54] DISPLAY CABINET

[75] Inventor: Georges Coppel, Paris, France

[73] Assignee: Construction Mills-K, France

[22] Filed: Sept. 29, 1975

[21] Appl. No.: 617,549

Related U.S. Application Data

[63] Continuation-in-part of Ser. No. 411,334, Oct. 31, 1973, abandoned.

[52] U.S. Cl. .......................... 214/16 B; 214/164 R
[51] Int. Cl.$^2$ ......................................... B65G 47/00
[58] Field of Search ....... 214/16 B, 16.4 R, 16.4 A, 214/16.4 B

[56] References Cited

UNITED STATES PATENTS

| | | | |
|---|---|---|---|
| 3,417,879 | 12/1968 | Gough | 214/16 B |
| 3,557,973 | 1/1971 | Louviers | 214/16 B |
| 3,709,383 | 1/1973 | Jennings et al. | 214/16.4 B X |
| 3,800,963 | 4/1974 | Holland | 214/16.4 A |

Primary Examiner—Robert J. Spar
Assistant Examiner—R. B. Johnson
Attorney, Agent, or Firm—William Anthony Drucker

[57] ABSTRACT

A collecting system which may be used for a display cabinet, including an elongated frame at a first extremity or entrance of which are deposited packages which are to be removed from the other extremity or exit. The frame has a profiled shape, comprising two upper horizontal parts on which the packages are deposited and a lower horizontal runway in between, on which lower runway runs an automotive carriage comprising automatic electro-mechanical means comprising cooperating carrier rollers raising any package and carrying it to the exit.

8 Claims, 11 Drawing Figures

DISPLAY CABINET

CROSS-REFERENCE TO RELATED APPLICATION

This is a Continuation-in-part of Applicant's U.S. Pat. application Ser. No. 411,334 filed Oct. 31, 1973, now abandoned.

BACKGROUND OF THE INVENTION

1. Field of the Invention

The invention relates to the field of automatic collecting systems which automatically transfer packages loaded at a first extremity of "entrance" of an horizontal lane to a second extremity or "exit." It relates more particularly to collecting systems handling light weight parcels such as those used as display cabinets in groceries and like stores, where various articles offered for sale are displayed at the exit of single or superimposed rows.

2. The Prior Art

Many kinds of automatic collecting systems for display cabinets are known, where the frame is slanted in such a manner that the packages collect by gravity against the front of the display cabinet, removal of a package causing all the rest of the row to slide. Sliding by gravity has been facilitated by the installation of ramps fitted with wheels, making it possible to reduce the slant of the frames. Nevertheless, this slant has obvious disadvantages, since it involves a waste of space, the frames having to be raised notably on the package entrance side. Moreover, it is known that if the frames are of some length, the packages can, by gravity, reach excessive speed which is dangerous to their contents and their packing, when they stop abruptly on reaching the front. Braking devices have had to be provided to palliate this danger. Automatic collecting systems have also been proposed, in which the packages are stored on horizontal racks and collected by means of automotive carriers. Such systems are described, for example in U.S. Pat. Nos. 3,417,879 and 3,557,973. These systems relate to systems which allow, among other operations, the collection of heavy loads and, although of course they might be used for carrying small packages, they are too bulky and sophisticated for being of practical use in connection with display cabinets or like uses. A further collecting system described in U.S. Pat. No. 3,731,790 eliminates the use of hydraulic or mechanical jacks of the former systems, but, this, at the expense of a highly complex mechanical system, which remains also too bulky and too expensive for the actual utilization.

BRIEF SUMMARY OF THE INVENTION

The object of the invention is an automatic collecting system of simple construction and operation, specially fitted for handling light packages, without any risk of injuring the same. The invention's system is of the type in which the loads are stored horizontally and displaced by means of a carriage. It comprises a horizontal U-shaped frame having upper horizontal bearer areas on which the loads are deposited; the bottom of the U forms a runway for an automotive carrier and bus bars are provided on the vertical walls of the U for ensuring the electrical supply of the carriage and its automatic operation of the carrier. The carriage comprises first mechanical retractable detecting means detecting the presence of a package in front of the carriage when the latter moves in one direction; said first mechanical detecting means are retracted only when the carriage has partially engaged, in the said direction, under a first package, and are raised again when the carriage, while having continued to move under the said package, and being under the totality of the latter, the said detecting means do not detect a further package immediately next to the latter; the carriage comprises also further mechanical means which cooperate with said raising means, for raising said package, and moving it along with the carriage, and deposit it again on the upper runways when the said first means detect the presence of a package. The said means actuate contacts which control the starting and stopping of the carriage.

DETAILED DESCRIPTION OF THE INVENTION

For the sake of clarity, the numerous references used throughout the description are listed in the following table.

| Reference | Meaning | Figures where shown |
|---|---|---|
| A, B, C | pedal contacts | 7 |
| A', B', C' | alternative positions of A, B, C | 7 |
| E | bistable contact | 7 |
| F | frame | 1 – 4 |
| G | carriage | 1 – 2 |
| f1, f2 | light feelers | 1 – 2 |
| I | entrance | 1 – 2 |
| IP | entrance priority control key | 9 – 10 – 11 |
| $mo_1$, $mo_2$ | ILS on the carriage | 2 |
| m1, m2 | magnets which actuate respectively the forward and reverse contacts 30 and 34 | 2 |
| M | motors voltage control contact | 9 – 10 – 11 |
| M1, M2 | driving motors | 9 – 10 – 11 |

-continued

| Reference | Meaning | Figures where shown |
|---|---|---|
| NW | normal working control key | 9 – 10 – 11 |
| O | exit | 1 – 2 |
| OP | exit priority control key | 9 – 10 – 11 |
| P | cross piece which lowers the feeler assembly | 2 |
| Pa, Pb, Pc | pedals actuated by the loads and monitoring contacts A,B,C | |
| Rc | relay (frame feed) | 7 |
| Re | resistor | 9 – 10 – 11 |
| Rm | relay which controls the feeding of electromagnet 40 monitoring rod Y | 8 – 9 – 10 – 11 |
| Rm1, Rm2 | contacts of relay Rm | 8 – 9 – 10 – 11 |
| Rs | forward-reverse relay, controlling the direction of rotation of motors M1, M2 and the feeding of electromagnet 20, latching the feeler assembly in the lower position | 8 – 9 – 10 – 11 |
| Rv | relay controlling the feeding of motors M1, M2 | 9 – 10 – 11 |
| x, y | contact positions of bistable E | 7 |
| Y | retractable rod, controlled by electromagnet, and actuating, if non retracted, bistable element E | 2 – 3 – 4 |
| Numerals | | |
| 1 | Frame runway for the carriage | 1 – 2 – 6 |
| 2 | Vertical walls of the frame | 1 – 2 – 6 |
| 3 | Bearer bars | 1 – 2 – 6 |
| 4, 5 | Bus bars | 6 |
| 6 | Side walls of the carriage | 3 – 4 |
| 7 | Front bearer roller | 3 – 4 |
| 8 | Driving roller | 3 – 4 |
| 9 | Driving roller | 3 – 4 |
| 10, 11 | Feeler assembly | 3 – 4 |
| 12 | Axis of roller 9 | 3 – 4 |
| 13 | Feeler roller, mounted within the feeler side walls 10 | 3 – 4 |
| 14 | Front lifting roller carried by the feeler assembly | 3 – 4 |
| 15 | Clutch roller | 3 – 4 |
| 15a | Axis of roller 15 | 3 – 4 |
| 15b | Arcuate groove for 15a | 3 – 4 |
| 16 | Rear lifting roller | 3 – 4 |
| 18 | Spring urging upwards the feeler assembly | 3 – 4 |
| 19 | Spring urging upwards the rear lifting roller | 3 – 4 |
| 20 | Electromagnet locking, when excited, the feeler assembly in lower position | 3 – 4 |
| 21 | blade | |
| 22 | rod — actuated by | 5 |
| 22a | spring — 20 for locking | |
| 23 | extremity of rod 22 — 10 – 11 | |
| 25a, 25b | terminals of motors M1, M2 | 8 – 9 – 10 – 11 |
| 26, 27, 28, 29 | contacts of relay Rs | 8 – 9 – 10 – 11 |
| 30 | "forward" contact controlling the forward movement of motors M1, M2, actuated by mo1 | 8 – 9 – 10 – 11 |
| 31, 32 | contacts of relay Rs | 8 – 9 – 10 – 11 |
| 33 | terminals of relay 20 | 8 – 9 – 10 – 11 |
| 34 | "reverse" contact controlling the reverse movement of the motors actuated by mo2 | 9 – 10 – 11 |
| 35 | contact actuated by the light feeler f1 | 8 – 9 – 10 – 11 |
| 36 | contact actuated by the light feeler f2 | 8 – 9 – 10 – 11 |
| 38, 39 | terminals to which are coupled selectively various circuits according to which one of the three keys NW, IP, OP is actuated | 9 – 10 – 11 |

-continued

Figure 3:
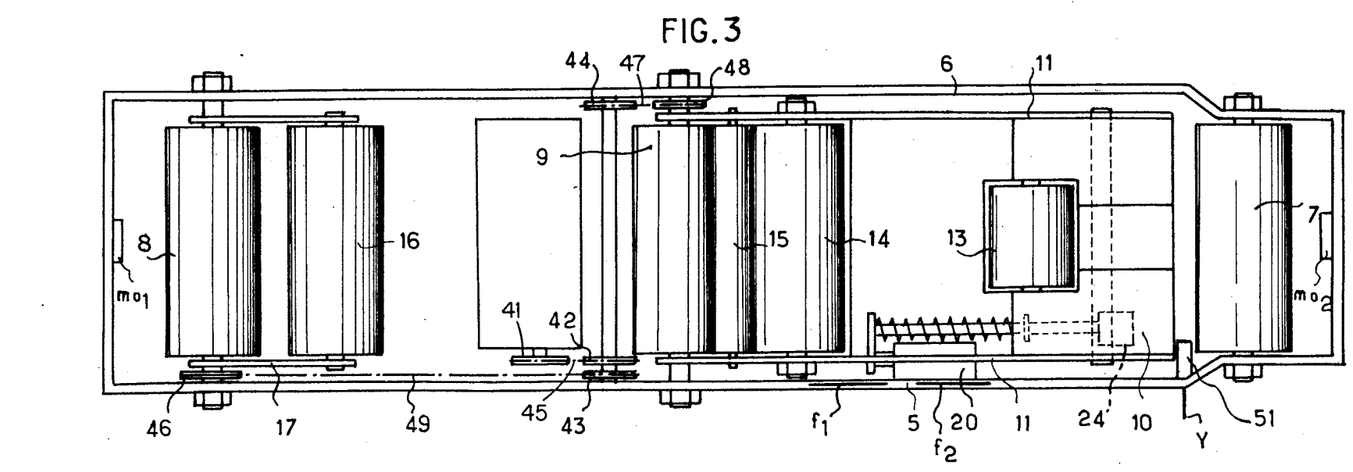
FIG. 3 shows a plane view of the carriage of the system.
Figure 4:
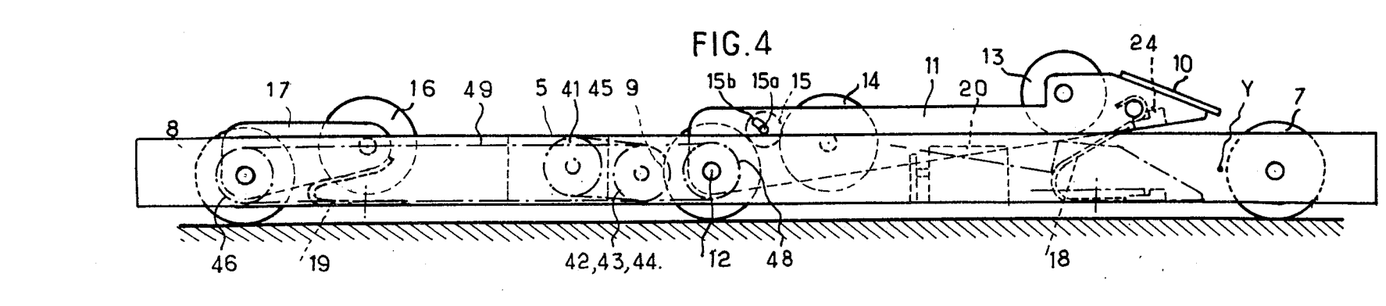
FIG. 4 shows a side view of the same.
Figure 5:
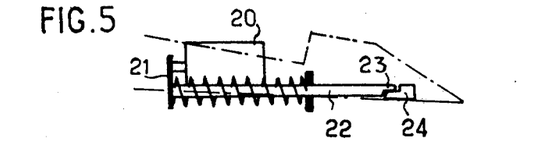
FIG. 5 shows a locking device of an element of the carriage.

| Reference | Meaning | Figures where shown |
|---|---|---|
| 40 | electromagnet, controlled by relay Rm, and controlling the rod Y position | 3 – 4 |
| 41 42 43 44 | toothed driving wheel  toothed wheel | 3 – 4 |
| 45 46 47 | chain | 3 – 4 |
| 48 | toothed wheel | 3 – 4 |

Figure 1:
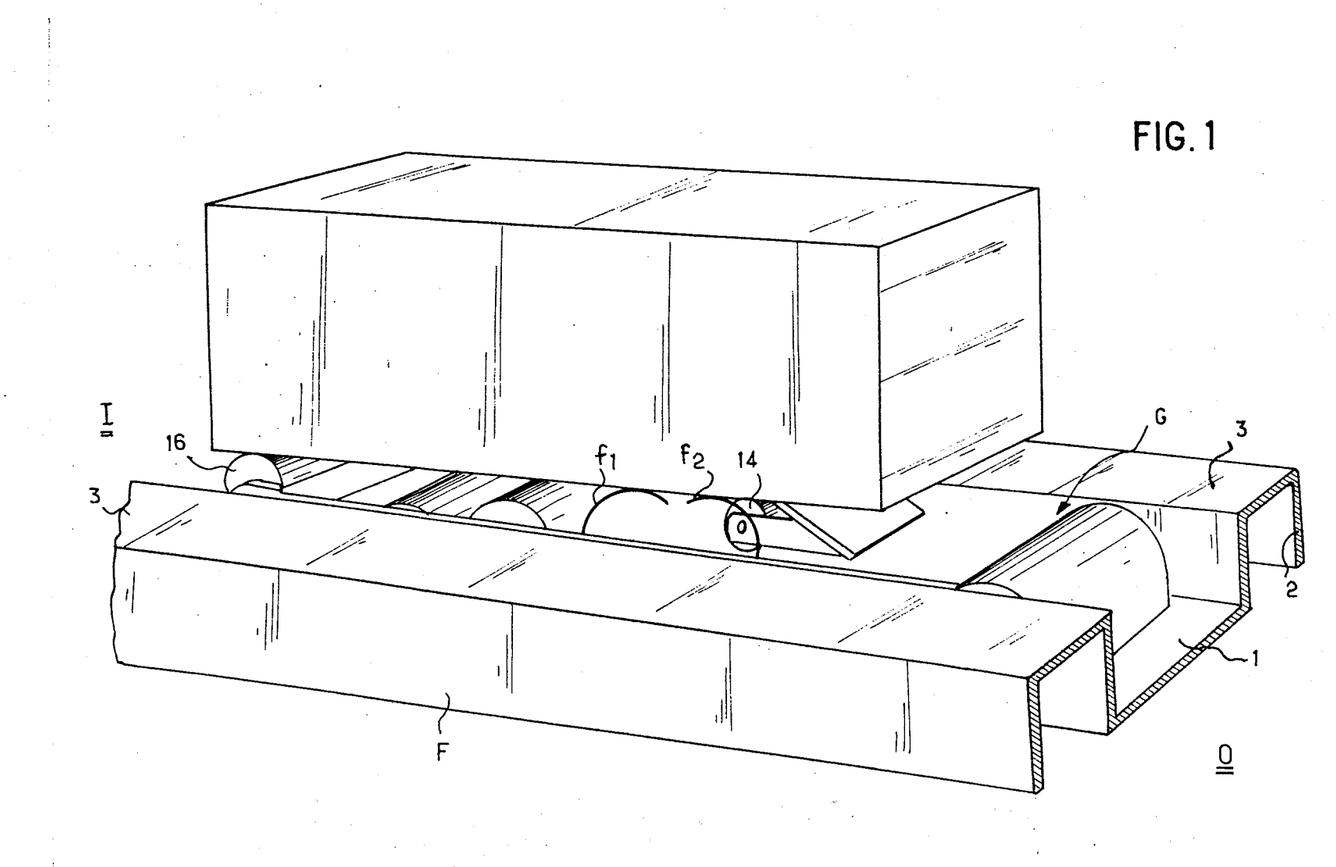
FIG. 1 is a perspective view of the system of the invention showing the cooperation of the frame and the carriage.
Figure 2:
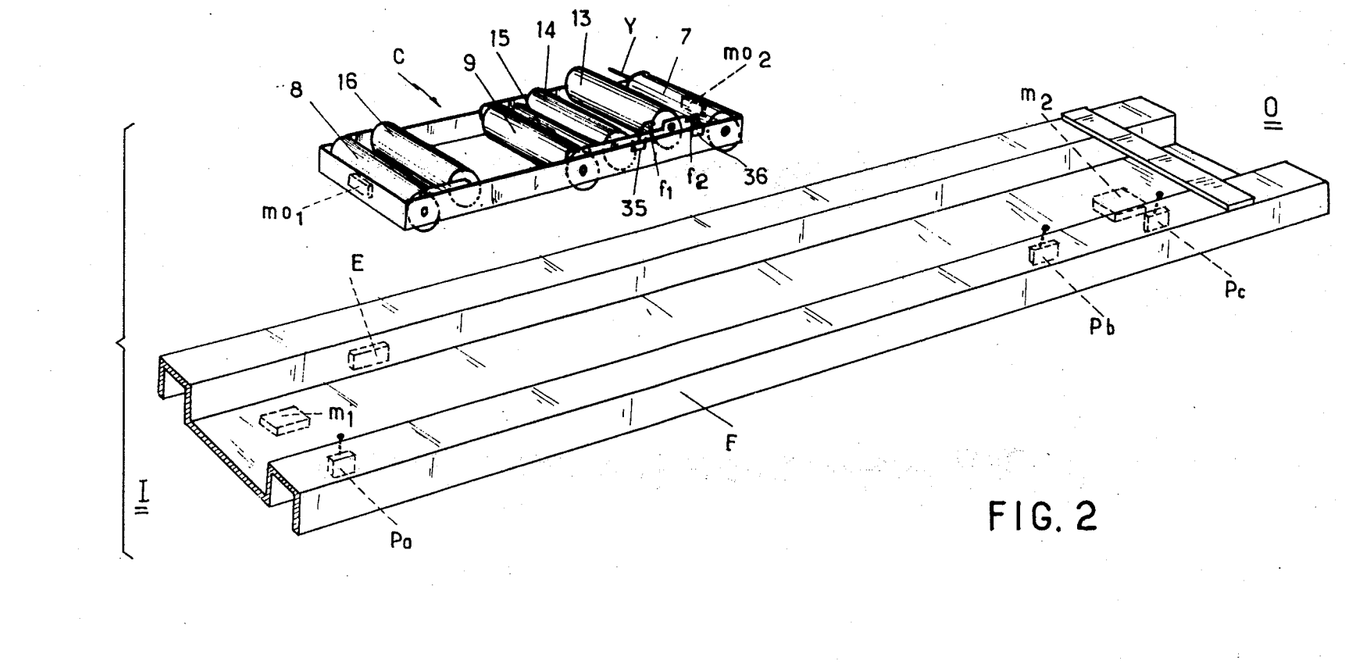
FIG. 2 is an exploded schematic perspective view of the same system, showing details not visible on FIG. 1.
Figure 6:
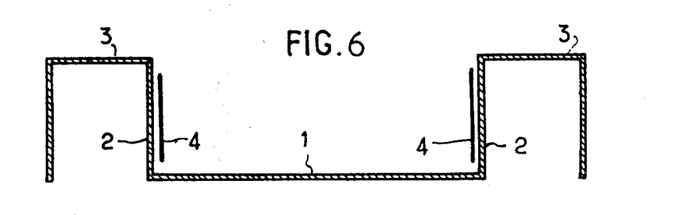
FIG. 6 shows the shape of the frame of the system and the electric supply conductors.
Figure 7:
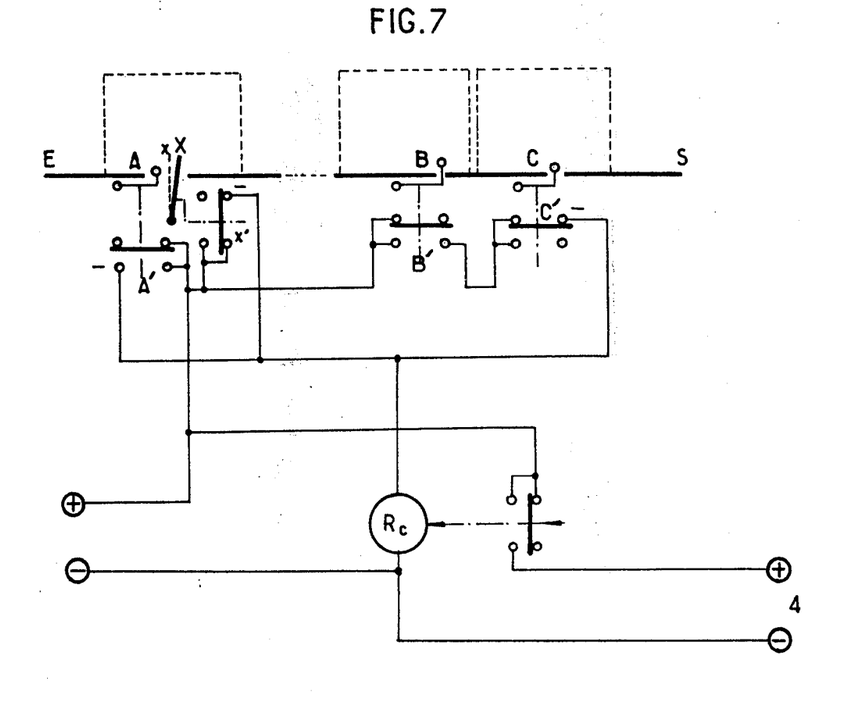
FIG. 7 shows an electrical diagram of the frame.

The electromechanical system of the invention, shown in perspective view in FIG. 1, automatically collects near the exit 0 packages placed at the entrance I. It comprises i. a U-shaped frame F, an enlarged view of the cross section of which is shown in FIG. 6 ii. a carriage G, which runs on the bottom runway 1, formed by the lower part of the U frame iii. electromechanical and electromagnetic elements, such as contact, relays, on the frame and on the carriage, which elements will be explained later; and iv. supply rails 4 inside the vertical walls 2 of the frame. The packages with which this system deals are hand-carriable and no special device is necessary to place them on the shoulders or bearer areas 3 of the frame at the entrance side I. The carriage G lifts the package and carries it to the exit side 0 where it deposits the package again on the bearer areas 3. The carriage G is guided along the runway 1 by the vertical walls 2. In a preferred embodiment the frame is made of moulded plastic, the bearer areas having a width of 70 mm, the vertical walls having a height of 74 mm, the width of the runway for the carriage being 215 mm. Alternatively the frame may be made of a sheet of metal and the dimensions can be different. The various contacts on the frame are shown in detail in the exploded schematic view of FIG. 2 where, for clarity, the carriage has been taken out of its runway. The relays, electromagnets and contacts in the carriage are shown in the enlarged views of the carriage, FIGS. 3 and 4. Travel limit devices are provided at both the extremities of the frame, for reversing the movement of the carriage. These devices are up to those skilled in the art, such as stops or rods on the frame actuating switches on the carriage, photocell, and like. They may be built up, e.g. as stops 80, 90 and switches S3, S5 of the above mentioned U.S. Pat. No. 3,417,879. In a preferred embodiment, these devices are built up by the cooperation of magnets m1 and m2 glued at the extremities of the frame, with induction sensitive limit switch inverters (known under the abbreviation ILS) placed on the carriage at the extremities of the carriage, at mo1, mo2. Pa, Pb, Pc, are pedals or like devices on frame F. They are up to those skilled in the art and may be built up, e.g., as pedals C and the B of U.S. Pat. No. 3,417,879. However, in the preferred embodiment shown, they comprise plungers, which, when depressed by a package (the packages being wider than the U frame as shown in FIG. 1), push down respective contacts A, B, C (FIG. 7) to positions A', B', C', springs, in the boxes, urging upwards the plungers in the absence of a package, above the bearer area level. Devices Pb and Pc are placed near the exits, respectively at the last position of a carriage, and the position just ahead; device Pa is placed at the first position, near the entrance. Thus, pedal Pa detects the presence of a load at the entrance, pedal Pb detects the presence of a load at the penultimate position and Pc that of a load at the last position. In a preferred embodiment, allowing for a more versatile operation of the automatic cycle of the carriage, the frame is fitted with a further device, E which is a bistable contact actuated by a retractable rod, Y (shown FIGS. 3 and 4) emerging laterally from carriage G each time the carriage passes along device E, independently of the direction of displacement of the carriage. Contact E has two positions, $x$, X, the operation of which will be explained later with reference to FIG. 7. Device E comprises, in a preferred embodiment a two positions switch actuated by a lever which is rocked in either of its two positions by retractable rod Y. Rod Y is controlled by an electromagnet, 40, which operates under the control of a relay R$m$. The carriage carries also two light feelers $f1, f2$ consisting of incurved wires, staggered one behind the other, termed "forward feeler" and "reverse feeler." These sprung feelers detect the presence of a package under which the "Mini-robot" is circulating by momentarily pushing in sprung when they are flattened by a package, then closing respective contacts 35 and 36 (FIGS. 8, 9, 10, 11). FIGS. 3 and 4 show two views of the carriage. They show a chassis or case made by joining two side walls 5 and 6, bearing at the front a bearer roller 7, at the rear a bearer or driving roller 8, in the centre a driving roller 9. The driving rollers 9, and, in the preferred embodiment, the also driving roller 8, may be powered by any known means: external motor electrical or not, and transmission means, internal electric motors... In the preferred embodiment shown in FIG. 4, the forwards and backwards travelling of the carriage is controlled by a d.c. moto-reductor, supplied with a 12$v$ voltage by means of conventional trolleys sliding on bus bars 4 : the toothed driving wheel 41 drives, by means of chain 45, wheel 42 which is mounted on the same shaft as wheels 43 and 44. In an embodiment having the frame dimensions precedently given by way of examples, each drive roller is 40 watts powered and carries packages at a speed of 50 meters/minute. Wheel 43, by means of chain 49 drives wheel 46 mounted on the shaft of roller 8, thus driving this latter, while wheel 44 drives, by means of chain 47, wheel 48, this latter driving roller 9. On the axis 12 of roller 9 are articulated the two transversal blades of a rocking feeler assembly further comprising a slanted cross piece 10 joining the blades, and supporting a feeler roller 13, a lifting roller 14, and an engaging roller 15 whose axis 15$a$ can slide in an arcuate groove 15$b$, the center of rotation of the groove being at 12. This roller 15, when at rest, falls into a tangential position in relation to rollers 9 and 14. It can be seen that if the driving roller 9 rotates clock-wise, making the carriage move to the right, roller 14 rotates in the same direction, roller 15 being engaged with roller 14. But if the driving roller 9 rotates in the opposite direction, roller 15 is slightly raised and disengages, losing contact with roller 14. At the rear of the carriage a lifting roller 16 is/held by an articulated system consisting of two blades 17 pivotable around the axis of the driving roller 8 the axis of roller 16 being mounted in said blades. The first articulated system (pieces 10, 11 with rollers 13, 14) on the one hand, and the second articulated system (piece 17 with roller 16) on the other hand, are kept raised respectively by calibrated springs 18 and 19, V-shaped. The calibration of spring 18 is such that when the carriage comes beneath a package, the articulated system (10 + 11) with the feeler roller 13 retracts without lifting the package. But when the package gets past the feeler roller 13 it lands simultaneously on the lifting rollers 14 and 16, with half its weight on each of them. Moreover, the identical lever arms between 12 and 14, and between the axis of roller 8 and roller 16, are about three times smaller than the lever arm between 12 and 13. Springs 18 and 19 can now lift the package, the calibration of these springs having been calculated in accordance with the maximum expected weight to be lifted. The ratio ⅓ of the distances between the roller axes is not critical, the essential feature being that this ratio is greater than 1, in order that the lifting rollers are not raised to the upwards-carrying position as long as roller 13 is not arrived beneath the load. Taking different values of this ratio tantamounts to vary the distribution of the loads on the two rollers, and, at the same time, requires different calibration of the springs. The carriage thus continues on its way, taking with it the package which it has lifted. The friction of roller 14 under the package is sufficient to brake its relative slip and to keep it pushed forward on the feeler roller, at which time roller 14 no longer rotates and the engaging roller slips on the driving roller. If the carriage continues its forward movement, it may encounter another package, the inclined plane 10 and feeler 13 penetrate beneath this further package without lifting it. Roller 14 so lowered puts down the package which then only rests on roller 16, which is lowered in turn. The carriage thus continues on its way to the end of the frame, where an electric contact reverses its direction of movement. In accordance with the invention, the carriage lifts and transports the packages on its outward travel, but does not do so on its return travel. For this purpose, the electromagnet 20 (FIGS. 3, 4 and 5), by attracting a small blade 21, pushes a rod 22 until its extremity 23 locks into a stop 24 connected to the support of the feeler roller and situated, when the latter is lowered, opposite the extremity 23. In FIG. 4, the assembly 10-23-24 is shown in both upper and lower (dash-and dotted lines) positions. FIG. 7 shows a first example of embodiment of an electrical diagram feeding the frame of the carriage with low-voltage direct current. On the top horizontal line, I and 0 designate the entrance and the exit of the frame with the three contacts A, B, C actuated by devices Pa, Pb, Pc fitted with return springs bringing them back into the positions indicated in the diagram, the positions closing the contacts being A', B', C'. In dashes, three packages have been outlined in entrance (A), exit (C) and pre-exit (B) positions. Moreover, a relay Rc enables the frame to be fed when its coil is excited. An arrow indicates the direction of the effect due to the excitation. This coil is excited in three different ways:

1. when a package is placed at the entrance to the frame, pedal A is depressed, contact A' is closed, relay Rc is live;
2. when a package is removed at the exit, pedal Pc rises and closes contact C'. If a package is then in the penultimate position, pedal Pb corresponding thereto is depressed, contact B' is closed. As both contacts B' and C' are closed, relay Rc is energized, but if there is no package in the penultimate position, the closing of C' does not cause the relay to be energized;
3. besides the three sprung contacts A, B, C, the frame comprises a bistable contact E rocked every time the carriage passes, x and X are the two contacts of E. The carriage has a rod Y shown FIGS./1–4, which is moreover retractable, which effects this rocking from position x to X when the carriage leaves the entrance to go towards the exit, and conversely from position X to x when the carriage returns from the exit to the entrance position. The pedal in position X drives contact X' which excites relay Rc. If, therefore, pedal Pa or both pedals Pb and Pc starts the carriage with its rod Y out, as it moves away from the entrance it will rock x to X, and relay Rc causes the frame to be fed whether or not the pedals are depressed. On its return to the entrance, the carriage returns X to x, which cuts the feed to the frame so long as a further package is not introduced at A. However, this cutoff only occurs if the control rod Y is not retracted.

Figure 8:
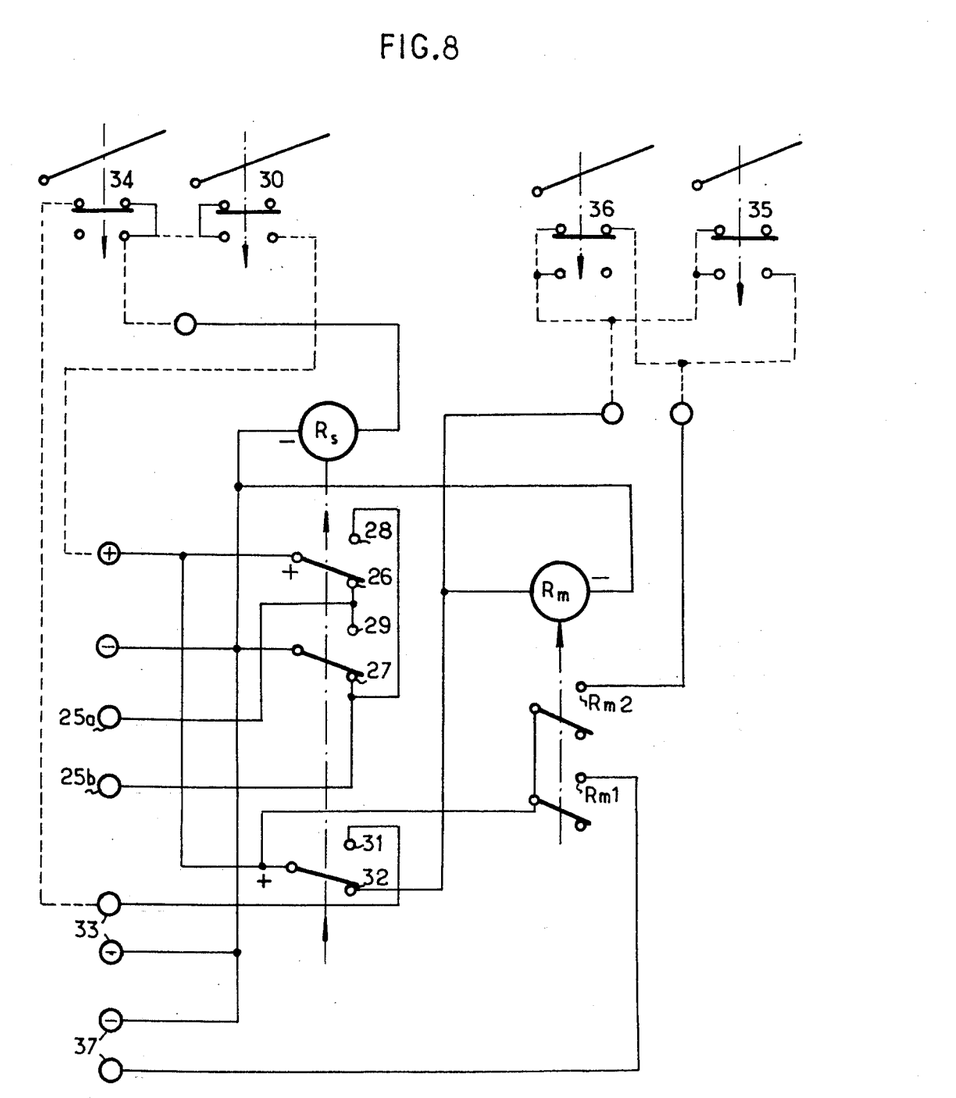
FIGS. 8, 9, 10 and 11, show electrical diagrams of the carriage.
Figure 9:
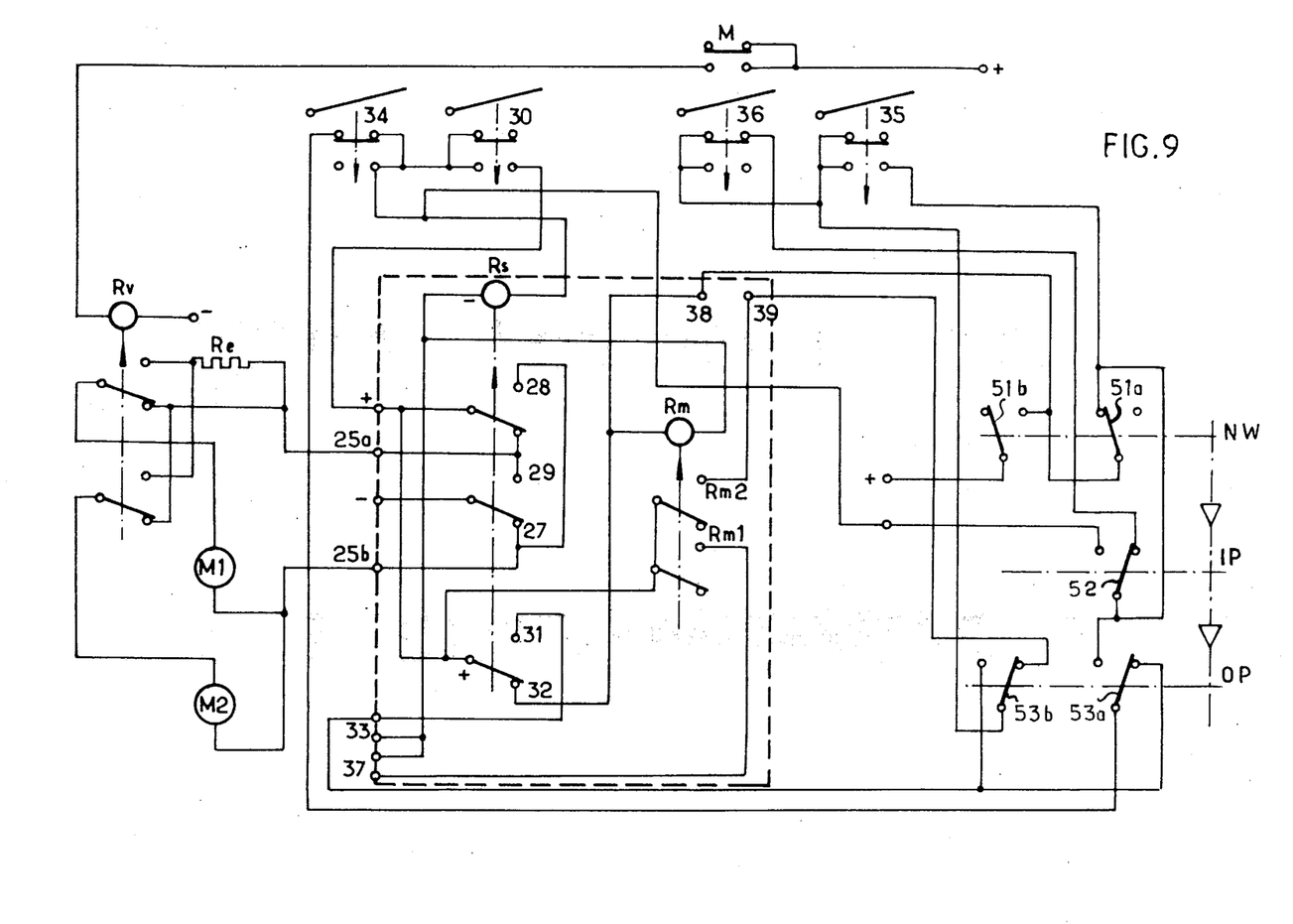
Figure 10:
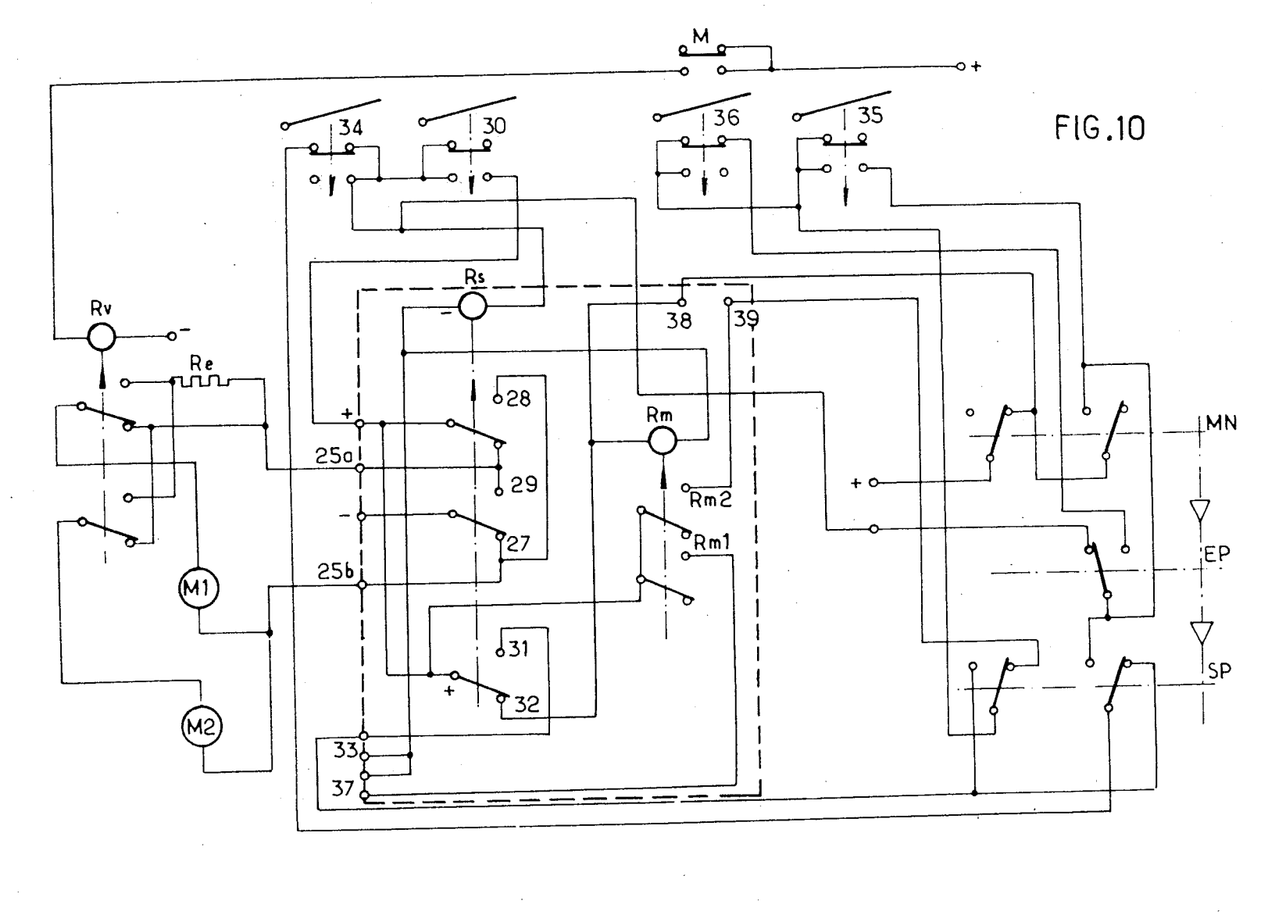
Figure 11:
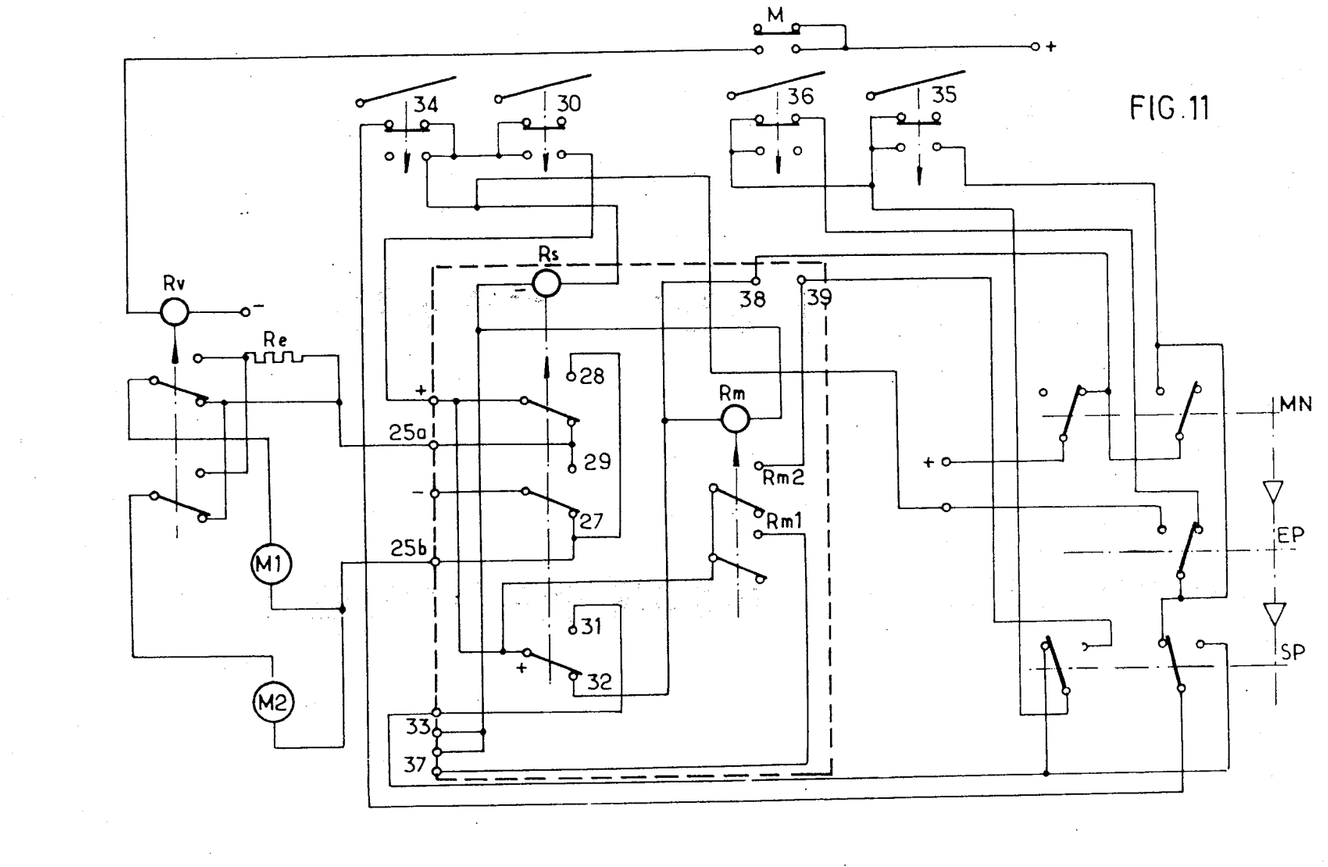

FIG. 8 shows the carriage feed diagram, arrows indicating the direction of the effect due to the excitation of each of the two relays Rs and Rm. This Figure shows the two (+) (−) terminals fed by a trolley sliding on the bus bars 4 of the frame. This feed is transmitted to the terminals 25a and 25b of the carriage motor(s) when, the relay Rs being not excited, contacts 26 and 27 are closed. If the relay is excited, the two contacts rock at 28 and 29, and the feed current is reversed. The carriage therefore moves forwards when the relay is not excited, and in reverse when it is excited. The relays mo1 and mo2 actuated by magnets m1 and m2 control respectively contacts 34 and 30. contact 30, normally open, closes when relay mO2 enters the field of magnet m2 and feeds relay Rs which remains excited by the closing of contact 31, and by a contact 34 normally closed. When device mO1 of the carriage, in reverse, comes in front of magnet m1 at the entrance, the opening of the contact 34 cuts the feed to Rs, thus reversing the movement. The contact 31 of relay Rs also feeds the electro-magnet 20 already described (FIG. 5) whose terminals are here shown at 33 and which keeps lowered the feeler roller 13 assembly and, therefore when the carriage is moving in the reverse direction. The contact 35 of the light feelers f1 is normally open and the contact 36 of the light feeler f2 is normally closed. Detection of a package by the forward feeler, f1, precedes that by the reverse feeler, f2, when the carriage is moving forwards, and vice versa when it is moving backwards. The retractable rod Y is controlled by the electro-magnet, 40, whose terminals are represented at 37, and termed "memory electro-magnet." Excitation of the latter causes the rod Y to come out and allows the pedal E (contacts x, X) to move as already described. This excitation occurs via relay Rm causing the closure of contact Rm1. When the carriage is moving forwards, the contact 32 due to the non-excitation of relay Rs excites relay Rm and extracts the rod Y. When the carriage returns, relay Rm remains excited by means of contact Rm2 and feelers contacts 35 and 36. Relay Rm therefore only stops of being excited if feeler f2 (contact 36) is lowered before feeler f1 (contact 35), i.e. if the carriage moves under a package when it is in reverse. In this case, the rod Y is retracted, pedal E is not rocked, the carriage therefore moves forward again and goes forth and back until all the packages are collected near the exit, without any "gap" being left between them that the feelers can detect. Relay Rm then remains excited, and the carriage stops at the end of the next reverse movement. With the circuit just described, the carriage, after having carried a package near the exit, comes back to the entrance and starts again operating. By adding to these circuits a three position switch and complementary wiring, it is possible, at will, either to have the "normal" operation of the carriage just described, or to make the carriage give priority to the exit, i.e. to operate again as soon as it detects a gap between two packages on its way back, or to make the carriage give priority to the entrance, i.e. to travel back to the entrance as soon as it encounters a gap for carrying the load stored at the entrance for filling the gap. For the sake of clarity the three positions a such a switch are split into three keys NW for normal working, IP for entrance priority and OP for exit priority, controlling respective associated contacts 51a, 51b for NW, 52 for OP and 53a, 53b for IP. These keys are operated by a switch which may be placed on any extremity of the frame. FIGS. 9, 10 and 11 respectively show the circuit when respectively key NW, key OP and key IP are respectively depressed. On these circuits is also shown a contact M, actuated by the feeler f2 and a relay Rv, the feed of which is controlled by contact M. Relay Rv, when energized, inserts a resistor Re in the supply circuit of motors M1 and M2, thus reducing the voltage applied to the same when no carriage is lifted (reverse movement). Two motors are shown, in the case of independent driving of drive rollers 8 and 9. In the case of the preferred embodiment shown in FIGS. 3, 4, only one motor, M1, is necessary. Turning now to FIG. 9, the key NW being depressed, the operation is similar to that described with reference to FIG. 8, the circuit of this FIG. 8 being framed within a dashed line. Depression of key NW alone drives the contacts indicated. Arrows indicate the direction of the effect due to the excitation of each of the two relays Rs and Rm shown in the diagram. This FIGURE shows the two (+) (−) terminals fed by a trolley sliding on the lane rails 4. This feed is transmitted to terminals 25a and 25b of the carriage's motor(s) when relay Rs, not excited, leaves contacts 26 and 27 closed. If the relay is excited, the two contacts rock at 28 and 29 and the feed current is reversed. The carriage therefore moves forward when the relay is not excited, and in reverse direction when it is excited. Contacts 30, 31, 34, and relay Rs are operated as in FIG. 8. At terminals 38 and 39, the two contact feelers 35 and 36 are in parallel and can cut off the auto-feed to relay Rm, and only contacts 30 (forward) and 34 (reverse) can alter the position of relay Rs. In FIGS. 8 and 9, where the key NW is not depressed, relay Rm is still excited, and the system is no longer used as in "normal working." In FIG. 10, where key IP is depressed, the forwards feeler f1 works in parallel with the forward movement contact 34 so that as soon as this feeler detects a package, the carriage puts the package down and returns in reverse as if the forwards contact 30 had been closed at the end of the frame. In FIG. 11, where key OP is depressed, feelers f1, f2, (contacts 35, 36) work together to detect a gap between two packages and then cut out the auto-excitation of relay Rs, reversing the direction of movement as soon as this detection occurs. The carriage goes off with the package under which it has just passed moving forwards or stows all packages near the exit until no gap can any longer be detected. The robot then stops and waits. The various circuits of FIGS. 8 and 9, 10, 11, as well as that of FIG. 7 may be carried out using all the known circuitry techniques and, preferably using the techniques of printed circuits glued onto one of the wall 2, for the circuit of the frame (FIG. 7) and onto one of walls 5 or 6 for the carriage circuits. The foregoing description is not limitative, and the invention obviously extends to all variants within the scope of the engineer carrying out the various elementary functions described as an example and combined with one another for all the objectives to be accomplished.

I claim:
1. A package transfer system, for automatically transferring packages along a horizontal lane from a first entrance extremity of the lane to a second exit extremity of the lane, comprising:
 i. a lane including electrical supply rails, two laterally-spaced upper horizontal runways to receive packages loaded thereon, and a central lower runway between said upper runways,
 ii. an automotive removable carriage placed on said lower runway and including
  a. current collector trolley means slidable on said rails,
  b. retractible mechanical detecting means on said carriage for detecting the presence of a package in front of the carriage when the carriage moves in the direction from the first extremity towards the second extremity, said mechanical detecting means being arranged to be retracted only when said carriage has partially engaged, in the said direction, under a package encountered, and being arranged to be restored again when, with the carriage having continued to move under said package until eventually wholly supporting said package, the said detecting means do not detect a further package immediately following said encountered package, and
  c. further mechanical means and raising means on said carriage to cooperate in raising said encountered package and moving it along with the carriage and depositing it on said upper runway when the said mechanical detecting means detect the presence of a further package adjacent to which the said encountered package is deposited.

d. said mechanical detecting means comprises an assembly angularly movable about a pivot axis into upper and lower limiting positions, said assembly including a feeler roller, a spring urging said feeler roller to a raised position, said spring being selected to be of such strength that it cannot alone raise a package the weight of which is greater than a predetermined value, e. said further mechanical means include a first lifting roller carried on said assembly, the distance of the axis of the first lifting roller from the pivot axis being less than the distance of the axis of the feeler roller to the pivot axis, a second lifting roller disposed at the rearward extremity of the carriage, a second spring urging said second lifting roller to a raised position, said second spring being selected to be of such strength that it cannot alone raise a package the weight of which is greater than said predetermined value, said first and second springs being together capable of lifting a package resting on said first and second lifting rollers and of a weight greater than said predetermined weight 2. A package transfer system, as claimed in claim 1, comprising a driving roller, and a clutch roller between said driving roller and said first lifting roller, said clutch roller having its axis slidable in an arcuate slot and being arranged such that it engages in driving relationship with said driving roller and said first lifting roller and causes said first lifting roller to be driven by said driving roller only when the driving roller rotates in the direction required for movement of the carriage in the forwards direction from the entrance to the exit.

3. A package transfer system, as claimed in claim 2, comprising locking means on said carriage for locking said detecting means in the retracted position when the carriage moves in the direction from exit to entrance, and for automatically unlocking said detecting means when the carriage commences a movement in the direction from entrance to exit.

4. A package transfer system, according to claim 3, further comprising electromechanical means including a first switch arranged to be closed when the carriage engages a first travel limit stop at the exit of the lane, a second switch arranged to be closed when the carriage engages a second travel limit stop at the entrance of the lane, and circuit means operated by said switches for controlling the starting of movement of the carriage from the exit to the entrance when the first switch is closed and for controlling the starting of movement of the carriage from the entrance to the exit when the second switch is closed, said electromechanical means further controlling the actuation of said locking means.

5. A package transfer system according to claim 4, further comprising on the upper horizontal runways a pad at the entrance for indicating the presence of a package thereupon, a pad at the exit for indicating the presence of a package thereupon, and a pad for indicating the presence of a package at the position next to the exit position, said system further comprising: bistable means on the fixed structure near the entrance, and actuating means on said carriage cooperating with said bistable means for switching off the electrical supply of the rails when the carriage reaches the entrance position, as long as the said entrance pad is not indicating the presence of a package.

6. A package transfer system, according to claim 5, wherein said circuit means comprises a first relay cooperating with said first and second switches for controlling the starting of movement from entrance to exit and from exit to entrance, and wherein said first relay further controls the locking of said detecting means in the inoperative position, and a second relay controls the operation of said actuating means cooperating with the bistable means, said bistable means being operative when the second relay is energised, the first relay being energised only during backward motion of the carriage and the second relay being normally energised through a contact of the first relay when the first relay is not energised.

7. A package transfer system, as claimed in claim 6, comprising a self-supply circuit for said second relay, contacts which are normally adapted to close the self-supply circuit of the second relay, a flexible forward feeler on the carriage, a flexible reverse feeler on the carriage, said forward feeler and said reverse feeler being staggered, said feelers being positioned to detect the presence of a package under which the carriage passes, said feelers cooperating with said contacts, said contacts normally closing the self-supply circuit of the second relay except in the case that said reverse feeler detects the presence of a package before the forward feeler, the release of said second relay rendering the said actuating means inoperative.

8. a package transfer system, as claimed in claim 7, wherein said circuit means comprises a first key, a second key, and a third key, and wherein:- i. said first key duplicates the operation of the first switch at the exit of the lane, such that when the carriage has picked up a first package and put it down behind a second package the carriage is caused to return to the lane entrance as though said first switch had been operated;

ii. said second key duplicates the operation of said second switch at the entrance of the lane, such that when a package is removed at the exit of the lane, the carriage is caused to move forwards to pick the penultimate package and place it at the end of the lane, to reverse, to detect another package, to pick it up, and to move forward to place it behind the first package, thus successively placing all of the packages collected near to the exit of the lane, thereafter to return to the lane entrance, and then to move forward again as if said second switch at the entrance to the lane had operated, iii. said third key controls the automatic collecting of the packages in order that no gap remains between any two packages.

* * * * *